(12) United States Patent
Schroeder et al.

(10) Patent No.: US 10,837,861 B1
(45) Date of Patent: *Nov. 17, 2020

(54) SYSTEMS AND METHODS FOR DETECTING HOSE FAILURE

(71) Applicant: United Services Automobile Association (USAA), San Antonio, TX (US)

(72) Inventors: Eric David Schroeder, San Antonio, TX (US); Ashley Raine Philbrick, San Antonio, TX (US); Manfred Amann, San Antonio, TX (US); Donna Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,523

(22) Filed: Oct. 31, 2019

Related U.S. Application Data

(63) Continuation of application No. 15/901,704, filed on Feb. 21, 2018, now Pat. No. 10,502,654.

(60) Provisional application No. 62/461,665, filed on Feb. 21, 2017.

(51) Int. Cl.
*F16L 11/127* (2006.01)
*G01M 3/40* (2006.01)

(52) U.S. Cl.
CPC .............. *G01M 3/40* (2013.01); *F16L 11/127* (2013.01)

(58) Field of Classification Search
CPC ........ G01M 3/40; F16L 11/127; G01N 15/00; G01N 17/00; G01N 15/12; G01N 15/1227; G01N 15/1218; G01N 17/02; G01N 15/1245
See application file for complete search history.

(56) References Cited

U.S. PATENT DOCUMENTS

| | | | | |
|---|---|---|---|---|
| 10,234,350 B1 * | 3/2019 | Schroeder et al. | ..... | G01M 3/18 |
| 10,502,654 B1 * | 12/2019 | Schroeder et al. | ..... | G01M 3/18 |
| 2012/0278018 A1 * | 11/2012 | Hastreiter | ............... | G06F 19/00 |

* cited by examiner

*Primary Examiner* — Jermele M Hollington
*Assistant Examiner* — Suresh K Rajaputra
(74) *Attorney, Agent, or Firm* — Fletcher Yoder, P.C.

(57) ABSTRACT

A system configured to detect failure of a hose includes a sensor assembly having a body with a first arm and a second arm pivotally coupled to one another at respective first ends, and the body is configured to move between a closed position and an open position. The sensor assembly also includes a first electrical contact positioned at a respective second end of the first arm and a second electrical contact position at a respective second end of the second arm. The first electrical contact and the second electrical contact are configured to contact one another to form a complete electrical circuit when the body is in the closed position and are configured to be separated from one another to form an open electrical circuit when the body is in the open position to facilitate detection of the failure of the hose.

20 Claims, 7 Drawing Sheets

SYSTEMS AND METHODS FOR DETECTING HOSE FAILURE

CROSS-REFERENCE TO RELATED APPLICATIONS

This application is a continuation of U.S. patent application Ser. No. 15/901,704, entitled "SYSTEMS AND METHODS FOR DETECTING HOSE FAILURE," filed Feb. 21, 2018, which claims priority to and the benefit of U.S. Provisional Application No. 62/461,665, entitled "SYSTEMS AND METHODS FOR DETECTING HOSE FAILURE," filed Feb. 21, 2017. These applications are hereby incorporated by reference in their entirety for all purposes.

BACKGROUND

The present disclosure relates generally to systems and methods for detecting hose failure. More specifically, the present disclosure relates to techniques that facilitate detecting hose failure and providing an indication of hose failure to a user.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Hoses (e.g., water hoses, fluid hoses, or flexible hoses) may be used to connect various appliances or equipment to a fluid supply (e.g., water supply, liquid supply, or gas supply). For example, one hose may be utilized to connect a washing machine to a hot water supply and another hose may be utilized to connect the washing machine to a cold water supply. Such hoses may leak, tear, or burst during operation and/or over time.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system configured to detect failure of a hose includes a sensor assembly. The sensor assembly includes a body having a first arm and a second arm pivotally coupled to one another at respective first ends, and the body is configured to move between a closed position and an open position. The sensor assembly also includes a first electrical contact positioned at a respective second end of the first arm and a second electrical contact position at a respective second end of the second arm. The first electrical contact and the second electrical contact are configured to contact one another to form a complete electrical circuit when the body is in the closed position and are configured to be separated from one another to form an open electrical circuit when the body is in the open position to facilitate detection of the failure of the hose.

In one embodiment, a system configured to detect failure of a hose includes a body of a sensor assembly having a first arm and a second arm pivotally coupled to one another at respective first ends. The body is configured to move between a closed position in which the body circumferentially surrounds the hose and an open position in which respective second ends of the first and the second arm are separated from one another. The system also includes a leak detection assembly coupled to the body, wherein the leak detection assembly comprises one or more conductive elements and a fluid-absorbing member configured to detect a leak within the hose.

In one embodiment, a method of operating a hose failure detection system includes providing current through an electrical circuit formed at least in part by a first wire coupled to a first electrical contact and a second wire coupled to a second electrical contact of a sensor assembly positioned circumferentially about a hose, monitoring a resistance of the electrical circuit to determine whether the electrical circuit is closed or open, and providing an indication of failure of the hose if the resistance indicates that the electrical circuit is open.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Hoses (e.g., water hoses, fluid hoses, flexible hoses) may be used to connect various appliances or components to a fluid supply (e.g., water supply, liquid supply, or gas supply). For example, such hoses may be utilized with a variety of appliances (e.g., dishwashers, refrigerators, grills, or the like), with a variety of vehicle components (e.g., engines, radiators, or the like), or with various other components of pneumatically or hydraulically driven equipment. Such hoses may be configured to support flow of any of a variety of fluids (e.g., water, hydraulic fluid, pneumatic fluid, steam, fuel, coolant, air, or the like). However, hoses may leak, tear, or burst during operation and/or over time. In some cases, the hoses may balloon or expand radially (i.e., a diameter and circumference of the hose may increase) prior to tearing or bursting. Thus, radial expansion of the hose may be indicative of hose failure. In some cases, the radial expansion may often occur at an end portion of the hose proximate to a connector. To that end, the disclosed embodiments generally relate to a hose detection failure system that includes a sensor assembly configured to circumferentially surround the hose (e.g., the end portion of the hose) and to detect radial expansion indicative of hose failure. For example, the sensor assembly may include a clamp (e.g., a hinged clamp) that moves from a closed position to an open position as the hose expands, thereby enabling the hose detection failure system to detect the radial expansion of the hose. The hose detection failure system may also include a hub (e.g., a control panel) and/or a remote device (e.g., a tablet, a phone, a computer) that are configured to provide an indication of hose failure to a user, thereby enabling the user to turn off the water supply or replace the hose prior to tearing or bursting, for example.

Figure 1:
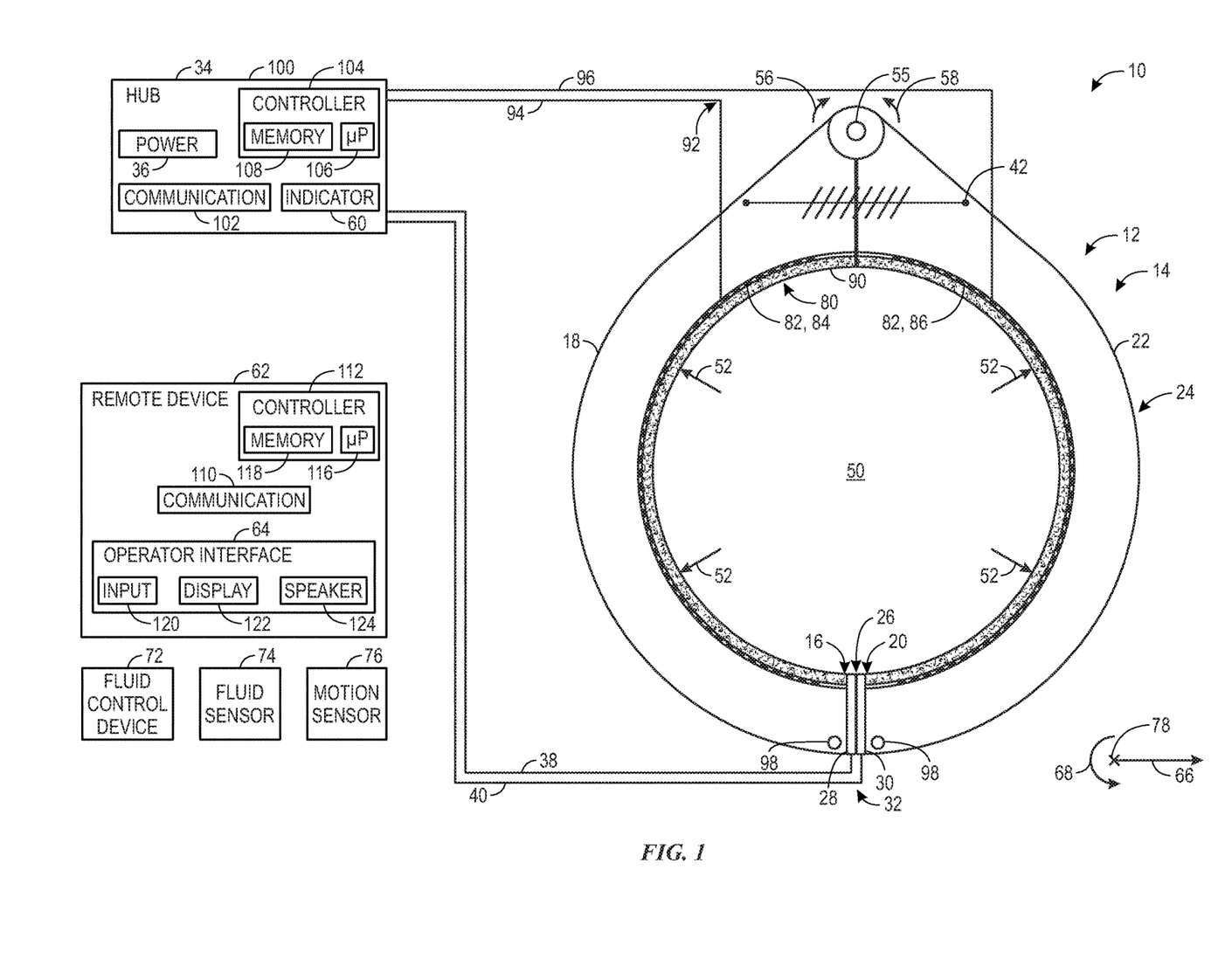
FIG. 1 illustrates a schematic diagram of a hose failure detection system wherein a sensor assembly is in a closed position, in accordance with embodiments described herein.

By way of introduction, FIG. 1 is a schematic diagram of a hose failure detection system 10 having a sensor assembly 12 in a closed position 14. In the closed position 14, a first end 16 (e.g., distal end portion) of a first arm 18 and a second end 20 (e.g., distal end portion) of a second arm 22 of a clamp 24 (e.g., hinged clamp, body, or bracket) of the sensor assembly 12 contact one another at an interface 26. The clamp 24 may be a rigid structure formed from metal materials, plastic materials, or any combination thereof; however, in some embodiments, the clamp 24 may be a flexible structure formed from polymer materials, or the like. A first contact 28 (e.g., electrically conductive contact or pad) may be positioned at the first end 16 of the first arm 18, and a second contact 30 (e.g., electrically conductive contact or pad) may be positioned at the first end 16 of the second arm 22. Thus, in the closed position 14, the sensor assembly 12 may close an electrical circuit 32 (e.g., form a continuous or complete electrical circuit; a first electrical circuit) and may enable current to flow from a hub 34 (e.g., a power or current supply 36 of the hub 34) through a first wire 38 coupled to the first contact 28, across the interface 26 via contact between the first contact 28 and the second contact 30, and back to the hub 34 via a second wire 40 coupled to the second contact 30. In certain embodiments, in the closed position 14, a biasing member 42 (e.g., spring) that is configured to bias the first arm 18 and the second arm 22 toward one another may be in a compressed position. In the closed position 14, the clamp 24 forms a generally annular or loop structure that defines an opening 50 that is configured to receive or to fit about a hose.

In operation, as the hose expands in a radial direction 66, the hose may exert a radially-outwardly directed force on the first arm 18 and the second arm 22, as generally shown by arrows 52. The force exerted by the hose may eventually overcome the biasing force of the biasing member 42, thereby causing the first arm 18 and the second arm 22 to pivot or rotate about a hinge 55 (e.g., pin) as shown by arrows 56, 58, separating the first contact 28 from the second contact 30, and breaking or opening the electrical circuit 32. As discussed in more detail below, processing components within the hub 34 may be configured to detect a break in the electrical circuit 32 and to provide an indication of water hose failure to a user, such as via an indicator 60 (e.g., display, light, speaker) of the hub 34 and/or to communicate with a remote device 62 to provide the indication of water hose failure to the user via an operator interface 64 of the remote device 62, for example.

Figure 2:
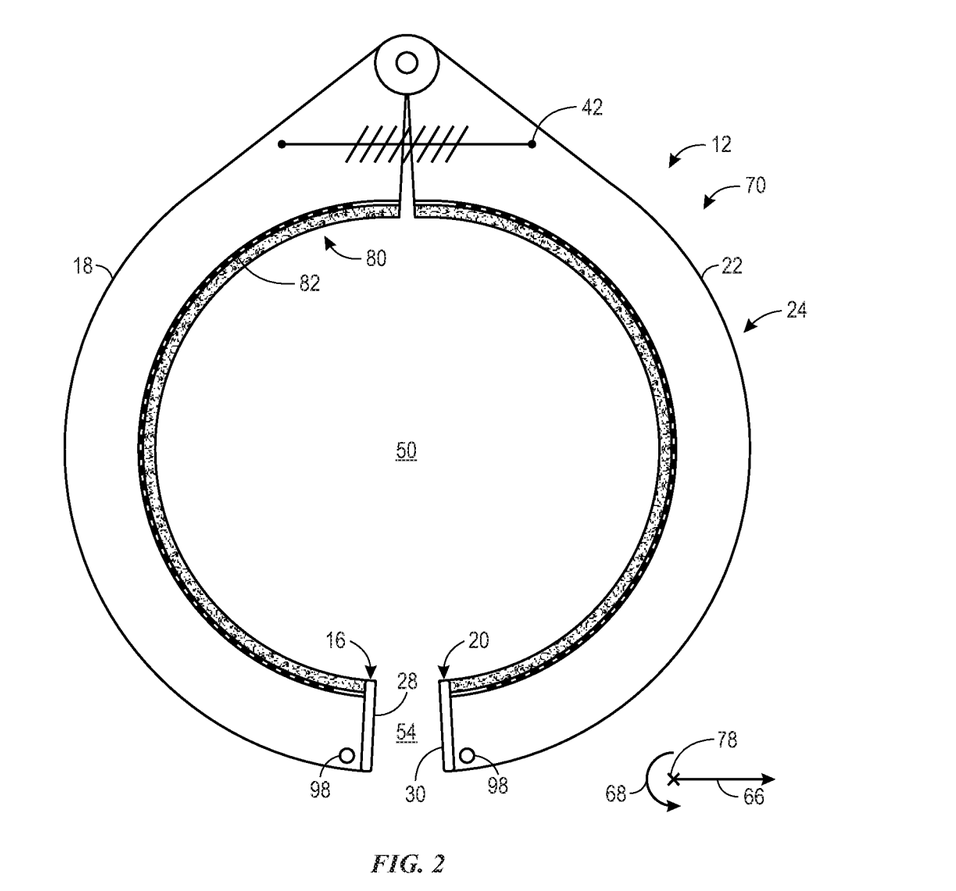
FIG. 2 illustrates a schematic diagram of the sensor assembly of FIG. 1 in an open position, in accordance with embodiments described herein.

With the foregoing in mind, FIG. 2 illustrates the sensor assembly 12 in an open position 70. In the open position 70, the first end 16 of the first arm 18 and the second end 20 of the second arm 22 of the clamp 24 are separated from one another by a gap 54 (e.g., circumferential gap or space) along a circumferential direction 68. Thus, in the open position 70, the electrical circuit 32 (FIG. 1) is broken or open. In certain embodiments, in the open position 70, the biasing member 42 is in an extended position (e.g., expanded position). In the open position 70, the clamp 24 no longer forms a generally annular or loop structure, but instead forms a generally c-shaped structure due to the presence of the gap 54.

Returning to FIG. 1, the sensor assembly 12 may additionally or alternatively include various other features. For example, the sensor assembly 12 may include a leak detection assembly 80 (e.g., fluid detection assembly) configured to detect the presence of fluid. In the illustrated embodiment, the leak detection assembly 80 includes one or more conductive elements 82 (e.g., conductive pad, wire, wire grid, wire mesh, or the like) that extend in the circumferential direction 68 about at least a portion of the opening 50 defined by the clamp 24. For example, in the illustrated embodiment, one conductive element 82, 84 is coupled to and/or extends along a portion of a radially-inner surface of the first arm 18 and another conductive element 82, 86 is coupled to and/or extends along a portion of a radially-inner surface of the second arm 22. In some embodiments, the one or more conductive elements 82 may be coupled to the clamp 24 via an adhesive, mechanical fastener (e.g., pin, staple, stake, tie), or the like.

As shown, the leak detection assembly 80 may include a fluid-absorbing element 90 (e.g., a foam, fabric, polymer) that extends in the circumferential direction 68 about at least a portion of the opening 50 defined by the clamp 24 to cover or to overlap the one or more conductive elements 82. In some embodiments, the fluid-absorbing element 90 may be configured to contact a radially-outer surface of the hose and may be positioned between the hose and the one or more conductive elements 82 with respect to the radial direction 66. In operation, fluid that leaks from the hose may be absorbed by the fluid-absorbing element 90, and the fluid within the fluid-absorbing element 90 may close an electrical circuit 92 (e.g., form a continuous or complete electrical circuit; a second electrical circuit) by electrically connecting the one or more conductive elements 82. Thus, current may flow from the hub 34 (e.g., the power or current supply 36 of the hub 34) through a third wire 94 coupled to the one conductive element 82, 84, between the one conductive element 82, 84 and the other conductive element 84, 86 via fluid within the fluid-absorbing element 90, and back to the hub 34 via a fourth wire 96 coupled to the other conductive element 82, 86. As discussed in more detail below, processing components within the hub 34 may be configured to detect completion of the electrical circuit 92 and to provide an indication of a leak or fluid presence to a user, such as via the indicator 60 (e.g., display, light, speaker) of the hub 34 and/or to communicate with the remote device 62 to provide the indication to the user via the operator interface 64 of the remote device 62, for example. It should be appreciated that the fluid-absorbing element 90 may not contact the first and second contacts 28, 30 (e.g., the first and second contact 28, 30 may be smaller). Furthermore, the fluid-absorbing element 90 may be a flexible or stretchable one-piece structure (e.g., annular structure or a c-shaped structure), rather than the two-piece structure shown. In such configurations, the fluid-absorbing element 90 may operate to detect leaks by completing the electrical circuit 92, even as the sensor assembly 12 moves to the open position 70 illustrated in FIG. 2 and even while the first and second contacts 28, 30 are separated from one another.

As shown in FIG. 1, the sensor assembly 12 includes a pair of magnets 98 positioned proximate to the first end 16 of the first arm 18 and the second end 20 of the second arm 22. In some embodiments, the pair of magnets 98 may act as a biasing member to bias or support the sensor assembly 12 in the closed position 14 and/or may adjust the radial force 52 needed to drive the sensor assembly 12 from the closed position 14 to the open position 70, for example. It should be understood that any suitable number of pairs of magnets 98 may be provided (e.g., along the radial direction 66 and/or an axial direction 78) and that one or more pairs of magnets 98 may be provided in addition to or as an alternative to the biasing member 42.

In the illustrated embodiment, the hose failure detection system 10 includes the hub 34 and/or the remote device 62. In some embodiments, the hub 34 may include a housing 100 that supports various components, such as the power or current supply 36 (e.g., a battery or a plug configured to draw power from a power outlet), the indicator 60, a communication device 102 (e.g., a wireless transceiver or transmitter), and a controller 104 (e.g., electronic controller) having a processor 106 and a memory 108. In some embodiments, the remote device 62 may include any suitable computer device, such as a general-purpose personal computer, a laptop computer, a tablet computer, a mobile computer, or the like that is configured in accordance with present embodiments. The remote device 62 may include various components, such as a communication device 110 (e.g., a wireless transceiver or receiver), a controller 112 (e.g., electronic controller) having a processor 116 and a memory 118, and the operator interface 64, which may include an input 120, a display 122, and a speaker 124, for example.

In some embodiments, the hub 34 may be positioned proximate to the sensor assembly 12 to provide an electrical current via the wires 38, 40, 94, 96 to facilitate detection of hose failure and/or the presence of fluid. In some embodiments, the processor 106 of the hub 34 may be configured to determine whether the sensor assembly 12 is in the closed position 14 or the open position 70 (e.g., based on a measured resistance through the electrical circuit 32) and/or whether fluid is present at the sensor assembly 12 (e.g., based on a measured resistance through the electrical circuit 92). For example, infinite resistance through the electrical circuit 32 indicates that the electrical circuit 32 is open, that the sensor assembly 12 is in the open position 70, and/or hose failure. Furthermore, infinite resistance through the electrical circuit 92 indicates that the electrical circuit 92 is open, that there is insufficient fluid absorbed by the fluid-absorbing member 90 to close the electrical circuit 92, and/or that no significant leaks are present proximate to the sensor assembly 12. The processor 106 of the hub 34 may be configured to provide an indication (e.g., a visual and/or audible indication) via the indicator 60. For example, upon detection of hose failure, the processor 106 may instruct the indicator 60 to illuminate and/or to provide an audible alarm.

In some cases, a diameter and circumference of the hose may vary under certain operating conditions, such as during temporary surges in water pressure or the like. In some embodiments, the biasing force exerted by the biasing member 42 and/or the one or more pairs of magnets 98 may be selected so that the sensor assembly 12 does not move from the closed position 14 to the open position 70 in such situations. In some such cases, the hub 34 and/or the remote device 62 may provide an indication of hose failure upon each detection of infinite resistance in the electrical circuit 32. However, in some embodiments, the hub 34 and/or the remote device 62 may be configured to monitor a duration of infinite resistance in the electrical circuit 32 and provide an indication of hose failure upon (e.g., only upon) detection of infinite resistance in the electrical circuit 32 for more than a predetermined period of time (e.g., 3, 5, 10, 30, 60, 120, 300 seconds or more). In this way, the hub 34 and/or the remote device 62 may limit the incidence of false alarms of hose failure.

Similarly, in some embodiments, the hub 34 and/or the remote device 62 may provide an indication of the presence of fluid at the sensor assembly 12 upon each detection of a threshold resistance in the electrical circuit 92. However, in some embodiments, the hub 34 and/or the remote device 62 may provide an indication of the presence of fluid at the sensor assembly 12 upon (e.g., only upon) detection of the threshold resistance for more than a predetermined period of time (e.g., 3, 5, 10, 30, 60, 12, 300 seconds or more). In this manner, the hub 34 and/or the remote device 62 may limit the incidence of false alarms due to condensation and/or minor variations in humidity (e.g., temporary increases in humidity).

In some embodiments, the remote device 62 may be positioned remotely from the hub 34 and/or the sensor assembly 12. For example, the remote device 62 may be a user's personal mobile computer, thereby enabling the user to receive an indication of hose failure and/or leak detection regardless of whether the user is present at the location of the hose (e.g., the user may receive an indication of hose failure for a washing machine that is located at the user's house, even while the user is not at the house). In operation, the hub 34 may provide a status indication to the remote device 62 via the communication devices 102, 110. For example, the hub 34 may provide information, such as an indication of hose failure and/or leak detection, an indication that the hose is functioning properly, and/or an indication that no leaks are detected at the sensor assembly 12, to the remote device 62 via the communication devices 102, 110. In some embodiments, the remote device 62 may be configured to provide a visual indication via the display 122 and/or an audible indication via the speaker 124 based on the information received from the hub 34. For example, the remote device 62 may provide a displayed text message and/or an audible alarm to alert the user of a detected hose failure.

In some embodiments, the hub 34 and/or the remote device 62 may be configured to track and/or provide an indication of historical data (e.g., data over time in tabular form or graphical form) of the status of the hose as monitored by the hose failure detection system 10. In some embodiments, the hub 34 and/or the remote device 62 may be configured to monitor multiple sensor assemblies 12 coupled to one or more appliances or components. For example, the hub 34 may be coupled to two sensor assemblies 12, such as one for a hot water supply to a washing machine and another for a cold water supply to the washing machine. In such cases, the remote device 62 may be configured to provide information related to the two sensor assemblies 12, as well as information related to one or more additional sensor assemblies 12 coupled to any of a variety of other appliances or components via one or more hubs 34. In some embodiments, the remote device 62 may enable a user to provide an input (e.g., via the input 120 or the display 122) to request a current status of one or more sensor assemblies 12 from one or more hubs 34.

It should be understood that any of the features, operations, and/or functions disclosed herein may be distributed between the hub 34 and the remote device 62 in any suitable manner. For example, the hub 34 may include a display (e.g., similar to the display 122) to provide displayed information (e.g., tables or graphs, text messages, or the like). Furthermore, while a wired connection is shown between the hub 34 and the sensor assembly 12, it should be understood that these components could be connected via a wireless connection. For example, a separate power source (e.g., a battery) may be provided proximate to or as part of the sensor assembly 12 to provide current through the electrical circuits 32, 92 to facilitate detection of hose failure and/or the presence of fluid. In some such cases, the sensor assembly 12 may include a communication device (e.g., a transceiver or a transmitter) to provide an indication of the status of the sensor assembly 12 to the hub 34 and/or to the remote device 62.

Additionally or alternatively, the hose failure detection system 10 may include a closed-loop control feature in which the hub 34 and/or the remote device 62 provide a command to a fluid control device 72 (e.g., valve) to block (e.g., stop or shut off) a fluid supply to the hose in response to a detected hose failure and/or fluid at the sensor assembly 12. In some embodiments, multiple sensor assemblies 12 may be positioned proximate to one another along the hose. In some such cases, a first sensor assembly 12 may include a first biasing member 42 that exerts a first biasing force, and a second sensor assembly 12 may include a second biasing member 42 that exerts a second biasing force greater than the first biasing force. In operation, detection of infinite resistance through the electrical circuit 32 of the first sensor assembly 12 may cause the hub 34 and/or the remote device 62 to provide an indication, while detection of infinite resistance through the electrical circuit 32 of the second sensor assembly 12 may cause the hub 34 and/or the remote device 62 to provide the command to the fluid control device to block the fluid supply to the hose.

Additionally or alternatively, a fluid sensor 74 may be utilized as part of the hose failure detection system 10. The fluid sensor 74 may be configured to detect fluid (e.g., pooled fluid) in the vicinity of the hose (e.g., on a floor or other surface of a laundry room). For example, the fluid sensor 74 may include two wires coupled to a current or power supply (e.g., the power or current source 36 of the hub 34) at respective first ends. In operation, fluid that leaks from the hose and pools on the floor may close an electrical circuit (e.g., form a continuous or complete electrical circuit; a third electrical circuit) by electrically connecting respective second ends of the two wires. Thus, in some embodiments, current may flow from the power or current source 36 of the hub 34 through one wire, through the fluid, and back to the hub 34 via another wire. Processing components within the hub 34 may be configured to detect completion of the electrical circuit (e.g., via detection of a threshold resistance) and to provide an indication of a leak or fluid presence to the user, such as via the indicator 60 (e.g., display, light, speaker) of the hub 34 and/or to communicate with the remote device 62 to provide the indication to the user via the operator interface 64 of the remote device 62, for example. Certain components of the fluid sensor 74 may be supported by or coupled to the sensor assembly 12. For example, the wires of the fluid sensor 74 may extend (e.g., downward toward the floor) from the sensor assembly 12 while the sensor assembly 12 is coupled to the hose.

It should also be appreciated that the fluid sensor 74 may include a fluid-absorbing element that contacts the respective ends of the two wires. In such cases, fluid that leaks from the hose and pools on the floor may be absorbed by the fluid-absorbing element to close an electrical circuit by electrically connecting respective second ends of the two wires. Thus, in some embodiments, current may flow from the power or current source 36 of the hub 34 through one wire, through the fluid within the fluid-absorbing element, and back to the hub 34 via another wire.

Additionally or alternatively, a motion sensor 76 may be used as part of the hose failure detection system 10. The motion sensor 76 may be configured to detect motion in the vicinity of the hose (e.g., within a laundry room). For example, the motion sensor 76 may be an optical sensor (e.g., passive infrared sensor), an acoustic sensor, or a microwave sensor. The motion sensor 76 may be coupled to the hub 34 (e.g., via a wired or wireless connection) and/or to the remote device 62 (e.g., via a wireless connection). Processing components within the hub 34 may be configured to process signals from the motion sensor 76 to determine whether a moving object (e.g., the user) is within the vicinity of the hose.

The indications provided by the hub 34 and/or the remote device 62 may be based on information collected using the sensor assembly 12, the fluid sensor 74, and/or the motion sensor 76. In particular, the hub 34 and/or the remote device 62 may provide one or more indications of hose failure upon detection of infinite resistance through the electrical circuit 32, upon detection of a threshold resistance in the electrical circuit 92, and/or upon detection of fluid at the fluid sensor 74 (e.g., via detection of a threshold resistance in the electrical circuit associated with the fluid sensor 74). For example, the hub 34 and/or the remote device 62 may be configured to provide a first type of indication upon detection of infinite resistance through the electrical circuit 32, and the hub 34 and/or the remote device may be configured to provide a second type of indication upon detection of infinite resistance through the electrical circuit 32 in combination with one or both of detection of a threshold resistance in the electrical circuit 92 and detection of fluid at the fluid sensor 74. Because the fluid at the leak detection assembly 80 and the fluid at the fluid sensor 74 may indicate the presence of fluid, the second type of indication may be generally more intense or alarming (e.g., louder, more frequent, provided both locally at the hub 34 and remotely at the remote device 62) as compared to the first type of indication. In some cases, the first type of indication may be an audible and/or visual indication at the hub 34 to enable the user to hear and investigate the indication while at home or upon returning home, while the second type of indication may be an audible and/or visual indication at both the hub 34 to gain the attention of the user and also at the remote device 62 to prompt the user to return home or to contact a service provider to investigate the issue. It should be appreciated that the first and second types of indications noted above are merely exemplary, and any type or combination of types of indications may be provided in response to detection of the various features disclosed herein. By utilizing both the sensor assembly 12 (which may include the leak detection assembly 80) and the fluid sensor 74, the hub 34 and/or the remote device 62 may limit the incidence of false alarms due to unimportant instances of hose expansion, condensation, and/or minor variations in humidity (e.g., temporary increases in humidity).

Furthermore, data from the motion sensor 76 may be utilized to provide a more effective indication to the user. For example, the hub 34 may provide the audible and/or visual indication to alert the user in response to detection of motion in the vicinity of the hose (e.g., the hub 34 provides the audible and/or visual indication to alert the user when motion is detected via the motion sensor 76 at or after the detection of the infinite resistance through the electrical circuit 32). However, the hub 34 may instruct the remote device 62 to provide the indication to alert the user if no motion is detected by the motion sensor 76 around the time of detection of the infinite resistance through the electrical circuit 32 or within a time period (e.g., within 5, 15, 30, 60, 120, or 300 seconds) after detection of the infinite resistance through the electrical circuit 32.

In some embodiments, the command provided to the fluid control device 72 may be based on information collected using the sensor assembly 12, the fluid sensor 74, and/or the motion sensor 76. For example, the hub 34 and/or the remote device 62 may automatically provide the command to close the fluid control device 72 to block fluid flow through the hose in response to detection of infinite resistance through the electrical circuit 32, detection of a threshold resistance in the electrical circuit 92, and/or detection of fluid at the fluid sensor 74 (e.g., via detection of a threshold resistance in the electrical circuit associated with the fluid sensor 74). However, in some embodiments, the hub 34 and/or the remote device 62 may not provide the command to close the fluid control device 72 to block fluid flow through the hose if the motion detector 76 detects motion in the vicinity of the hose. Instead, the hub 34 may provide an audible and/or visual indication to notify the user of the hose failure and to prompt the user to investigate the hose failure and to turn off the fluid control device 72, if needed. In this manner, the hose failure detection system 10 may enable the user to control the fluid control device 72 when the user is present, and may also proactively close the fluid control device 72 when the user is not present.

In some embodiments, the sensor assembly 12 may include various types of sensors (e.g., proximity sensors, reed switch sensors, optical sensors, spring strain sensors, or the like) and/or features (e.g., materials and/or structures with increased resistivity upon expansion) that enable the hub 34 and/or the remote device 62 to monitor, approximate, and/or quantify (e.g., via one or more algorithms) a degree of radial expansion of the hose and/or a distance between the first end 16 and the second end 20, which may enable the hub 34 and/or the remote device 62 to facilitate accurate detection of hose failure and/or reduce the incidence of false alarms. In some such embodiments, the hub 34 and/or the remote device 62 may be configured to monitor changes and/or a rate of change in the radial expansion of the hose and/or the distance between the first end 16 and the second end 20 over time, which may also facilitate accurate detection of hose failure and/or reduce the incidence of false alarms. Such techniques may be advantageous as certain hoses may demonstrate a particular pattern (e.g., rate of radial expansion, fluctuations in diameter, or the like) prior to tearing or bursting.

The processors 106, 116 disclosed herein may be any type of computer processor or microprocessor capable of executing computer-executable code. The processors 106, 116 may also include multiple processors that may perform the operations provided herein. The memories 108, 118 may be any suitable article of manufacture that can serve as media to store processor-executable code, data, or the like. These articles of manufacture may represent computer-readable media (e.g., any suitable form of memory or storage) that may store the processor-executable code used by the processors 106, 116 to perform the presently disclosed techniques. The memories 108, 118 may represent non-transitory computer-readable media (e.g., any suitable form of memory or storage) that may store the processor-executable code used by the processors 106, 116 to perform various techniques described herein. It should be noted that non-transitory merely indicates that the media is tangible and not a signal.

Figure 3:
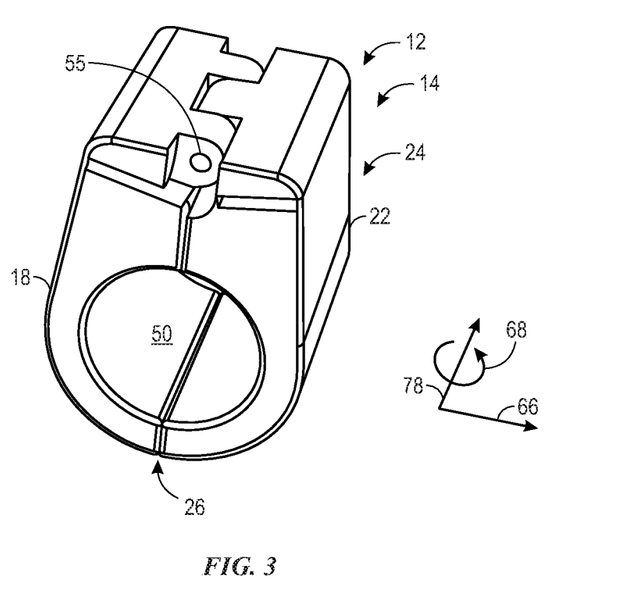
FIG. 3 illustrates a perspective view of a portion of the sensor assembly of FIG. 1 in the closed position, in accordance with embodiments described herein.
Figure 4:
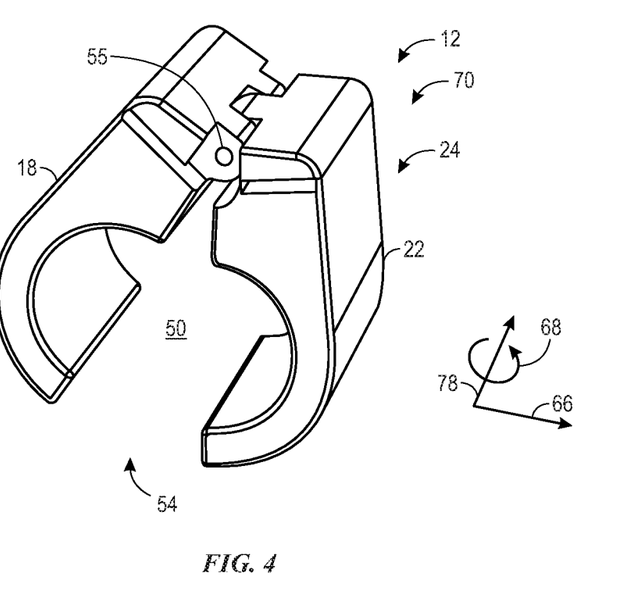
FIG. 4 illustrates a perspective view of the portion of the sensor assembly of FIG. 3 in the open position, in accordance with embodiments described herein.

FIG. 3 illustrates a perspective view of the clamp 24 of the sensor assembly 12 in the closed position 14, and FIG. 4 illustrates a perspective view of the clamp 24 of the sensor assembly 12 in the open position 70. In the closed position 14, the first arm 18 and the second arm 22 contact one another at the interface 26. In the open position 70, the first arm 18 and the second arm 22 are separated by the gap 54. The clamp 24 moves from the closed position 14 to the open position 70 as one or both of the first arm 18 and the second arm 22 rotate about the hinge 55. As shown, the hinge 55 extends in the axial direction 78 and is generally parallel to the hose when the hose is positioned within the opening 50 defined between the first arm 18 and the second arm 22. It should be understood that the clamp 24 may be adapted or modified to support various other components described above with respect to FIGS. 1 and 2, such as the biasing member 42, the leak detection assembly 80, the first contact 28, the second contact 30, the one or more pairs of magnets 98, the wires 38, 40, 94, 96, for example.

Figure 5:
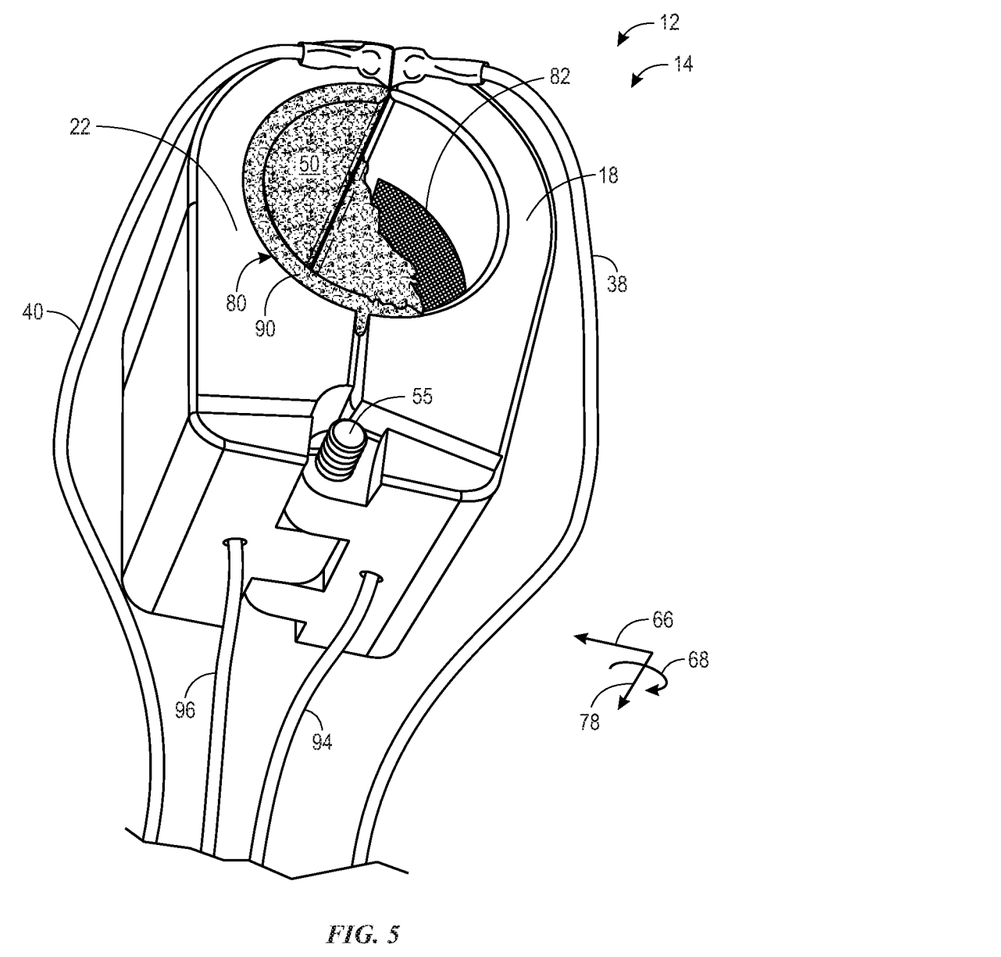
FIG. 5 illustrates a perspective view of a leak detection assembly of the sensor assembly of FIG. 1, in accordance with embodiments described herein.

FIG. 5 is a perspective view of the sensor assembly 12 in the closed position 14 and showing certain features of the leak detection assembly 80. As shown, the fluid-absorbing element 90 extends in the circumferential direction 68 about the opening 50 defined by the clamp 24. To facilitate discussion and for purposes of image clarity, a portion of the fluid-absorbing element 90 is removed to show a portion of one of the one or more conductive elements 82 that is positioned on the radially-inner surface of the first arm 18. FIG. 5 also illustrates various other features of the sensor assembly 12, such as the second arm 22, the hinge 55, and the wires 38, 40, 94, 96.

Figure 6:
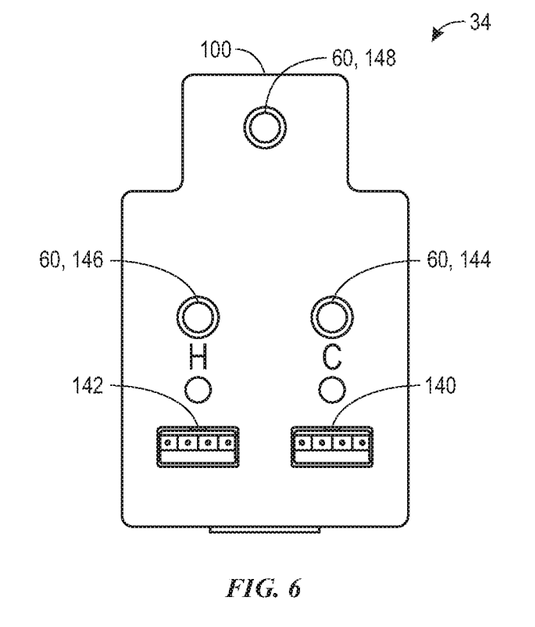
FIG. 6 illustrates a front view of a hub that may be utilized within the hose failure detection system of FIG. 1, in accordance with embodiments described herein.

FIG. 6 illustrates a front view of the hub 34 that may be utilized within the hose failure detection system 10. As shown, the hub 34 includes the housing 100, a first port 140 (e.g., connector) that is configured to electrically couple the hub 34 to one sensor assembly 12 (e.g., positioned about a cold water supply hose for a washing machine), and a second port 142 (e.g., connector) that is configured to electrically couple the hub 34 to another sensor assembly 12

(e.g., positioned about a hot water supply hose for the washing machine). The illustrated hub 34 also includes multiple indicators 60, including one indicator 60, 144 that may illuminate when the one sensor assembly 12 coupled to the hub 34 via the first port 140 indicates hose failure and another indicator that may illuminate when the other sensor assembly 12 coupled to the hub 34 via the second port 142 indicates hose failure, for example. The illustrated hub 34 also includes a power indicator 60, 148 that may illuminate when the hub 34 is properly connected to a power supply (e.g., power outlet). As discussed above, the hub 34 may include any of a variety of other components, such as the communication device 102, controller 104, the processor 106, and the memory 108. Furthermore, the indicators 60 of the hub 34 may include a display, a speaker, or the like to provide information to a user.

Figure 7:
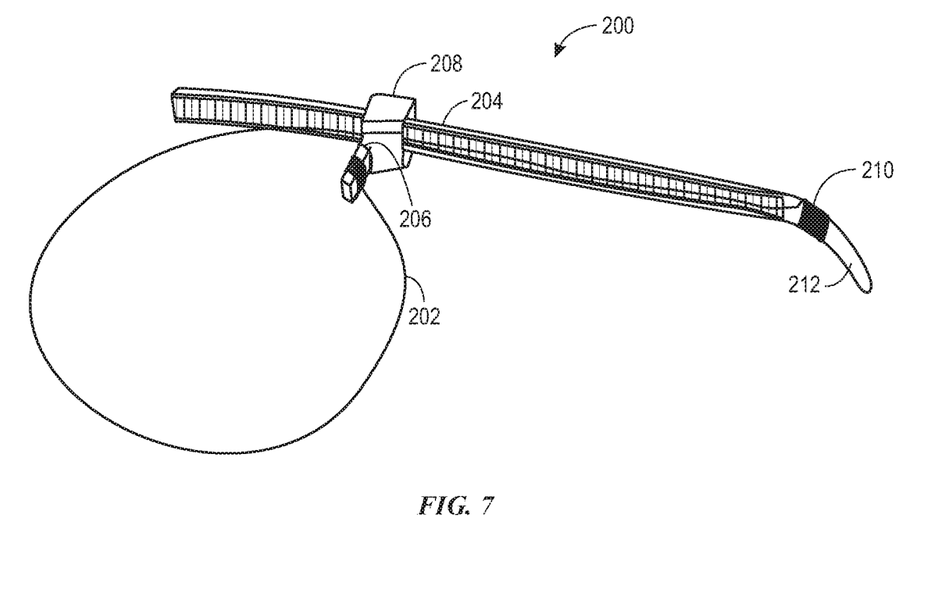
FIG. 7 illustrates a perspective view of a sensor assembly having a wire and a cable tie that may be utilized within a hose failure detection system, in accordance with embodiments described herein.
Figure 8:
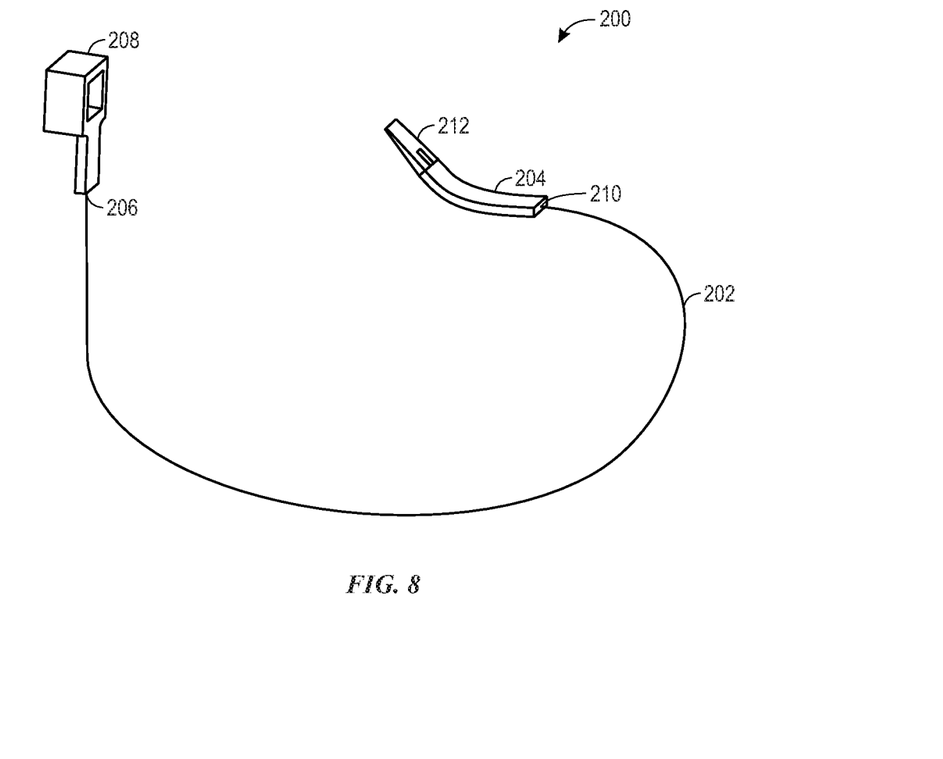
FIG. 8 illustrates a perspective view of another sensor assembly having a wire and a cable tie that may be utilized within a hose failure detection system, in accordance with embodiments described herein.

FIG. 7 illustrates a perspective view of an embodiment of a sensor assembly 200 having a wire 202 (e.g., a cable or flexible conductive thread) and a cable tie 204 (e.g., zip tie, cable wrap, wire harness, fastener) that may be utilized within the hose failure detection system 10. FIG. 8 is another embodiment of the sensor assembly 200 having the wire 202 and the cable tie 204 that may be utilized within the hose failure detection system 10. With respect to the sensor assembly 200, in operation, one portion 206 (e.g., end portion) of the wire 202 may be coupled to a case portion 208 of the cable tie 204, and another portion 210 (e.g., end portion) of the wire 202 may be coupled to a flexible tape portion 212 of the cable tie 204. The cable tie 204 may be utilized to efficiently and/or effectively apply the wire 202 about the hose with a proper degree of tension and/or with a proper length of wire 202 applied about the hose and/or without breaking the wire 202. For example, in some embodiments, the case portion 208 of the cable tie 204 may include a ratchet and the flexible tape portion 212 may include a gear rack. The cable tie 204 may be configured or marked (e.g., visibly marked) so that the flexible tape portion 212 of the cable tie 204 may be inserted into the case portion 208 until a predefined point that corresponds to the proper degree of tension and/or the proper length of the wire 202 about the hose. In some embodiments, the flexible tape portion 212 may be calibrated or configured to break when the flexible tape portion 212 reaches the predefined point, thereby leaving only the wire 202 circumferentially about the hose. Current may be provided through the wire 202 and the resistance through the wire 202 may be monitored (e.g., via the hub 34) to detect hose expansion and hose failure. For example, infinite resistance indicates a break in the wire and/or a radially-expanded hose due to hose failure.

Figure 9:
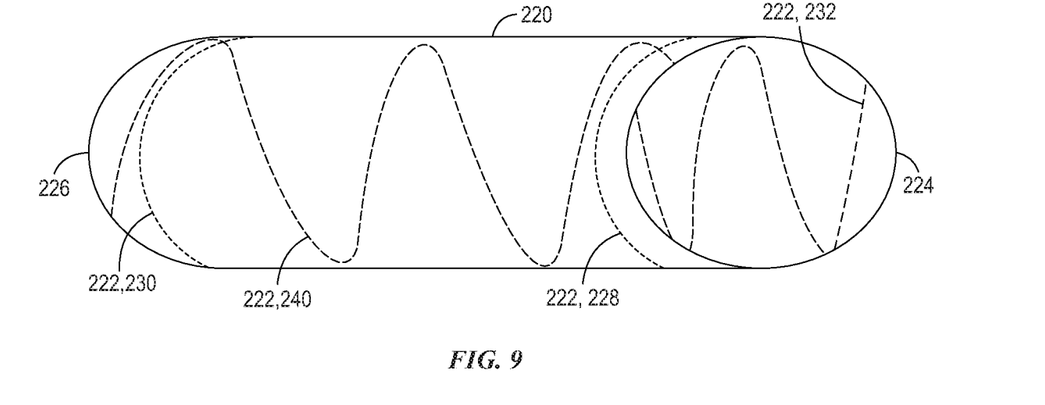
FIG. 9 illustrates a schematic diagram of a hose having an integrated wire that may be utilized within a hose failure detection system, in accordance with embodiments described herein.

FIG. 9 illustrates a schematic diagram of an embodiment of a hose 220 (e.g., flexible tubular member) having one or more integrated wires 222 that may be utilized within the hose failure detection system 10. In some embodiments, the one or more integrated wires 222 may be conductive traces, which could be deposited or printed onto the hose 220. In some embodiments, the one or more integrated wires 222 may be supported between layers of the hose 220, such that the wires 222 are not visible and/or accessible by a user. In some embodiments, the wires 222 cannot be physically separated from the hose 220 without damaging or tearing the hose 220.

In certain embodiments, one wire 222, 228 may circumferentially surround the hose 220 at a first end portion 224 of the hose 220 and another wire 222, 230 may circumferentially surround the hose 220 at a second end portion 226 of the hose 220, although any number of wires 222 may be positioned along the hose 220 at any suitable location. Current may be provided through the one or more wires 222 and the resistance through the one or more wires 222 may be monitored (e.g., via the hub 34). As noted above, infinite resistance indicates a break in the wire and/or a radially-expanded hose due to hose failure.

In certain embodiments, the one or more integrated wires 222 may not circumferentially surround the hose 220 or be annular in shape, but instead may have at least some portions having a wavy configuration (e.g., serpentine or sinusoidal wave configuration) extending along a length of the hose 220. For example, as shown, one wire 222, 232 may be generally positioned on a first lateral side of the hose 220 and extend along a length of the hose 220, and another wire 222, 234 may be generally positioned on a second lateral side of the hose 220 and extend along the length of the hose 220. The one wire 222, 232 and the other wire 222, 234 may be coupled together proximate the second end portion 226 of the hose 220 and may each be coupled to respective wires proximate the first end portion 224 of the hose 220 to form a complete electrical circuit. In this manner, expansion of the hose 220 may break the electrical circuit and enable detection of hose failure. Furthermore, the integrated wires 222 may be configured to facilitate detection of a leak. For example, if a fluid-absorbing member or layer is positioned to extend between one wire 222 and another wire 222, absorption of fluid may enable the fluid-absorbing member to electrically couple the wires to one another to enable detection of the leak in the manner described above. It should be understood that any of the features illustrated and described with respect to FIGS. 1-9 may be combined in any suitable manner. For example, one or more sensor assemblies 12 may be utilized with the hose 220 having one or more integrated wires 222.

Figure 10:
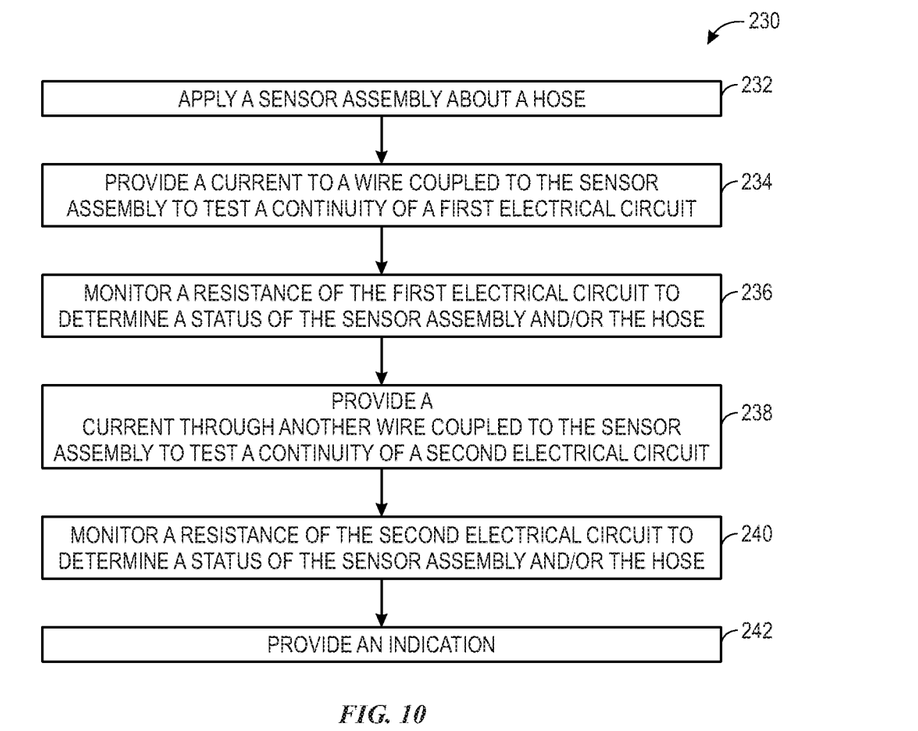
FIG. 10 is a flow diagram of a method of utilizing the hose failure detection system of FIG. 1, in accordance with embodiments described herein.

FIG. 10 is a flow diagram of an embodiment of a method 230 of utilizing the hose failure detection system 10 disclosed herein. The method 230 includes various steps represented by blocks. It should be noted that at least certain steps of the method 230 may be performed as an automated procedure by a system, such as the hose failure detection system 10. Although the flow chart illustrates the steps in a certain sequence, it should be understood that the steps may be performed in any suitable order, certain steps may be omitted, and certain steps may be carried out simultaneously, where appropriate. Further, certain steps or portions of the method 230 may be performed by separate devices. For example, a first portion of the method may be performed by the controller 104 of the hub 34, while a second portion of the method may be performed by the controller 112 of the remote device 62. It should be understood that the various features disclosed above with respect to FIGS. 1-8 may be incorporated and/or utilized with the steps of the method 230. While the method 230 is described with reference to the sensor assembly 12, it should be understood that the steps of the method 230 may be adapted to include the wire 202 and/or the hose 220 with the integrated wires 222.

To initiate the method 230, a user may apply a sensor assembly 12 about a hose (step 232). In some embodiments, to apply the sensor assembly 12, the sensor assembly 12 may be manually held in the open position 70, moved until the hose is positioned within the opening 50 defined by the clamp 24, and then the sensor assembly 12 may be released to enable the biasing member 42 to drive the sensor assembly 12 into the closed position 14 about the hose.

The method 230 may continue as current is provided (e.g., via the hub 34) through one of the first wire 38 or the second wire 40 to test the continuity of a first electrical circuit, such as the electrical circuit 32 (step 234). A processor, such as the processor 106 of the hub 34, may monitor the resistance of the electrical circuit 32 to determine a status of the sensor assembly 12 and/or the hose (step 236). For example, if the resistance of the electrical circuit 32 is infinity, the processor may determine that the sensor assembly 12 is in the open position 70 and/or that the water hose has failed. As noted above, in some embodiments, the processor may be configured to carry out various other processing steps, such as to monitor the duration over which the resistance is infinity and/or to quantify the degree of radial expansion, for example.

Current may additionally or alternatively be provided (e.g., via the hub 34) through one of the third wire 94 and/or the fourth wire 96 to test the continuity of a second electrical circuit, such as the electrical circuit 92 (step 238). The processor may monitor the resistance of the electrical circuit 92 to determine a status of the sensor assembly 12 and/or the hose (step 240). For example, if the resistance of the electrical circuit 92 is below a predetermined threshold, the processor may determine that fluid is present at the sensor assembly 12 and/or that the water hose has a leak. As noted above, in some embodiments, the processor may be configured to carry out various other processing steps, such as to monitor the duration over which the resistance falls below the predetermined threshold, for example. Furthermore, the processor may receive and process signals from the fluid sensor 74 and/or the motion detector 76, and the processor may provide commands (e.g., control signals) to the fluid control device 72, in the manner discussed above.

The method 230 may include providing an indication of the status of the sensor assembly 12 and/or the hose (step 242). As discussed above, the indication may be provided via the indicator 60 at the hub 34 and/or via the operator interface 64 at the remote device 62. The indication may include lights, displayed text messages, tables, graphs, and/or audible alarms, for example. It should be appreciated that different types of indications may be provided based on data collected from the sensor assembly 12, the fluid sensor 74, and/or the motion detector 76.

The disclosed embodiments provide the technical effect of detecting water hose failure. That is, the disclosed embodiments reduce the occurrence of water hose tears, ruptures, and/or leaks. Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter. While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A sensor assembly, comprising:
a body configured to be coupled to a hose while the sensor assembly is in a closed configuration; and
one or more conductive elements coupled to the body, wherein the one or more conductive elements are configured to form part of an electrical circuit such that the electrical circuit is closed while the hose has a first diameter and is open while the hose has a second diameter that is greater than the first diameter.

2. The sensor assembly of claim 1, wherein the body comprises a first arm and a second arm that are coupled to one another and that are configured to move relative to one another from the closed configuration to an open configuration as the hose expands from the first diameter to the second diameter.

3. The sensor assembly of claim 2, wherein the one or more conductive elements comprise a first conductive element positioned on the first arm and a second conductive element positioned on the second arm.

4. The sensor assembly of claim 3, wherein the first arm and the second arm are configured to move relative to one another between the closed configuration to enable the first conductive element and the second conductive element to contact one another to cause the electrical circuit to be closed while the hose has the first diameter and the open configuration to cause the first conductive element and the second conductive element to separate from one another to cause the electrical circuit to be open while the hose has the second diameter.

5. The sensor assembly of claim 2, wherein the first arm and the second arm are pivotally coupled to one another.

6. The sensor assembly of claim 2, comprising a biasing member configured to bias the first arm and the second arm toward one another and the closed configuration.

7. The sensor assembly of claim 1, wherein the body is configured to circumferentially surround the hose at least while the hose has the first diameter.

8. The sensor assembly of claim 1, wherein the one or more conductive elements comprise a wire that is configured to circumferentially surround the hose at least while the hose has the first diameter.

9. The sensor assembly of claim 1, comprising:
one or more additional conductive elements coupled to the body; and
a fluid-absorbing member coupled to the body and in contact with the one or more additional conductive elements, wherein the one or more additional conductive elements and the fluid-absorbing member are configured to cause a leak detection electrical circuit to be closed while a fluid is present at the fluid-absorbing member, and are configured to cause the leak detection electrical circuit to be open in the absence of the fluid at the fluid-absorbing member.

10. A system configured to monitor a condition of a hose, comprising:
a sensor assembly, comprising:
a first arm and a second arm coupled to one another;
a first conductive element coupled to the first arm; and
a second conductive element coupled to the second arm;
wherein the first arm and the second arm are configured to move relative to one another as the hose expands from a first diameter to a second diameter, thereby enabling the first conductive element and the second conductive element to contact one another to close an electrical circuit while the hose has the first diameter and enabling the first conductive element and the second conductive element to separate from one another to open the electrical circuit while the hose has the second diameter.

11. The system of claim 10, comprising one or more processors configured to determine the condition of the hose based on a resistance of the electrical circuit.

12. The system of claim 11, wherein the one or more processors are configured to instruct an indicator to provide an indication of the condition of the hose.

13. The system of claim 11, wherein the one or more processors are configured to determine a duration of the condition of the hose and to instruct an indicator to provide an indication of the condition of the hose in response to the duration exceeding a threshold time.

14. The system of claim 10, comprising one or more processors configured to determine that the hose has failed in response to detection of an infinite resistance of the electrical circuit.

15. The system of claim 10, wherein the sensor assembly is configured to circumferentially surround the hose.

16. The system of claim 10, comprising one or more additional conductive elements and a fluid-absorbing member, wherein the one or more additional conductive elements and the fluid-absorbing member are configured to cause a leak detection electrical circuit to be closed while a fluid is present at the fluid-absorbing member, and are configured to cause the leak detection electrical circuit to be open in the absence of the fluid at the fluid-absorbing member.

17. A method of detecting a condition of a hose, comprising:

providing current through an electrical circuit formed at least in part by one or more conductive elements of a sensor assembly coupled to the hose;

monitoring a resistance of the electrical circuit; and providing an indication of failure of the hose in response to the resistance indicating that the electrical circuit is open.

18. The method of claim 17, comprising:

providing the current through a leak detection electrical circuit formed at least in part by one or more additional conductive elements of the sensor assembly and a fluid-absorbing member of the sensor assembly;

monitoring a respective resistance of the leak detection electrical circuit; and providing another indication of a leak at the hose in response to the respective resistance of the leak detection electrical circuit indicating that the leak detection electrical circuit is closed.

19. The method of claim 17, comprising providing the indication of failure of the hose in response to the resistance indicating that the electrical circuit is open for a duration of time that exceeds a threshold time.

20. The method of claim 17, comprising controlling a supply of a fluid to the hose in response to the resistance indicating that the electrical circuit is open.

* * * * *